2,961,470
PROCESS FOR PREPARING POLYFLUORO-ALKANETHIOLS

William A. Sheppard, Wilmington, Del., assignor to E. I. du Pont de Nemours and Company, Wilmington, Del., a corporation of Delaware No Drawing. Filed Mar. 4, 1959, Ser. No. 797,039

16 Claims. (Cl. 260—609)

This invention relates to a new process for preparing highly fluorinated mercaptans. More particularly this invention relates to a new process for preparing polyfluoroalkanethiols.

In spite of the great advances made in recent years in the chemistry of organic fluoro compounds, highly fluorinated mercaptans are almost unknown. This is for the reason that no simple general method for preparing these compounds has been available. In particular, no satisfactory method is known for preparing aliphatic mercaptans in which all, or all but one, of the hydrogen atoms in the aliphatic chain attached to the carbon bearing the mercapto group are replaced by fluorine atoms. These compounds will be sometimes referred to here as polyfluoroalkanethiols.

It is an object of this invention to provide a new process for preparing polyfluoroalkanethiols. A further object is to provide a new process for preparing alpha,alpha-dihydroperfluoroalkane-alpha-thiols. A still further object is to provide a new process for preparing alpha,alpha,omega-trihydroperfluoroalkane-alphathiols. Another object is to provide a new process for preparing alpha,alpha,omega,omega-tetrahydroperfluoroalkylene-alpha,omega-dithiols. Other objects will appear hereinafter.

These and other objects of this invention are accomplished by the following new process of preparing polyfluoroalkanethiols of the formula X—R—CH$_2$SH, where X is H, F, or —CH$_2$SH and R is a perfluoroalkylene radical (i.e., a divalent aliphatic radical containing only carbon and fluorine) which comprises bringing into contact and reacting hydrogen sulfide with a compound of the formula Y—R—COZ, where Y is H, F, or —COZ, R is a perfluoroalkylene radical, and Z is OH or Cl, at a temperature of at least 150° C. and a pressure at least equal to the autogenous pressure of the reactants, with the further condition that, when the operating pressure is less than 1000 atmospheres, a sulfactive hydrogenation catalyst is used.

The reaction, starting with a polyfluoromonocarboxylic acid, can be represented by the equation

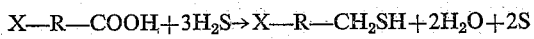

When the starting material is a polyfluoromonocarboxylic acid chloride, the reaction is represented by

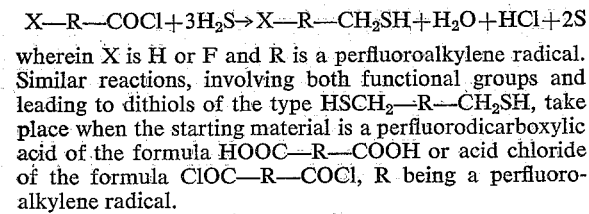

wherein X is H or F and R is a perfluoroalkylene radical. Similar reactions, involving both functional groups and leading to dithiols of the type HSCH$_2$—R—CH$_2$SH, take place when the starting material is a perfluorodicarboxylic acid of the formula HOOC—R—COOH or acid chloride of the formula ClOC—R—COCl, R being a perfluoroalkylene radical.

This type of reaction can be viewed as a reductive thiolation, even though no elemental hydrogen is present in the system, i.e., hydrogen sulfide is the sole source of hydrogen. The fact that replacement of the —COOH, or —COCl group by the —CH$_2$SH group occurs in polyfluoro compounds was totally unexpected since it was known previously (U.S. Patent 2,402,639) that the carboxyl group remains unaffected in the reaction of hydrogen sulfide with the carbonyl group of nonfluorinated ketoacids, even in the presence of elemental hydrogen and of a sulfactive hydrogenation catalyst.

The reaction is carried out by maintaining the two reactants in contact in a closed pressure vessel at the reaction temperature until an appreciable amount of polyfluorothiol has been formed. The relative proportions of hydrogen sulfide and polyfluorocarboxylic acid or acid chloride are not critical. They are important only to the extent that it is desirable to utilize as much of the more expensive polyfluoro compound as possible. For this reason, there is generally used at least three moles of hydrogen sulfide for each acyl group, since this is the amount theoretically required, and normally the hydrogen sulfide is used in excess, which can be quite large, e.g., up to 15 to 25 moles per acyl group or even more.

The reaction takes place at practical rates only at a temperature of at least 150° C. There is no critical upper limit of temperature below the decomposition point of the reactants and reaction products, but it is in general unnecessary to use temperatures exceeding about 300° C. The preferred temperature range is 175–275° C.

The process is carried out at least at the autogenous pressure developed by the reactants at the reaction temperature, which is of the order of about 200 atmospheres at 150° C. and correspondingly higher at more elevated temperatures. When no catalyst is used, it has been found that pressures higher than autogenous are necessary to make the reaction proceed in the desired direction. In such a case, the internal hydrogen sulfide pressure should be of the order of at least 1000 atmospheres, and preferably at least 2000 atmospheres. If this condition is not observed, the conversions are poor and, furthermore, such reaction as may take place leads chiefly to the polyfluorothiolcarboxylic acid, RCOSH, rather than to the polyfluorothiol. There is no critical upper limit of pressure. It can be as high as the equipment will withstand, e.g., up to 5000 atmospheres or higher.

It is however possible, by using an appropriate catalyst, to operate without excess pressure, that is, at the autogenous pressure developed by the reactants at the operating temperature. The catalysts suitable for use under such conditions are those known in the art as "sulfactive hydrogenation catalysts," see, for example, U.S. Patents 2,402,614 and 2,402,615, and also U.S. Patent 2,402,626 for an improved process of preparing them. These catalysts are sulfides, including polysulfides, of the hydrogenating metals in groups I, VI and VIII of the periodic table, e.g., the sulfides and polysulfides of chromium, cobalt, copper, iron, lead, molybdenum, nickel, tin, tungsten, vanadium and silver. The most active and preferred sulfactive hydrogenation catalysts are the sulfides of cobalt, molybdenum, nickel and iron. In the process of this invention, an amount of catalyst between 1 and 15% by weight of the polyfluorocarboxylic acid being treated is sufficient to accomplish the desired results. Of course, pressures higher than autogenous, e.g., up to 5000 atmospheres or more, can also be used if desired even when such catalysts are present in the reaction mixture.

Appreciable amounts of polyfluoroalkanethiol are usually obtained in reaction periods as short as 30–60 minutes. In general, it is unnecessary to prolong the reaction beyond 6–10 hours' contact at the operating temperature and pressure. The polyfluoroalkanethiol can be separated and isolated simply by fractional distillation at atmospheric or reduced pressure. The crude reaction product may also contain, besides unreacted polyfluorocarboxylic acid or acid chloride, which can be reused, variable and generally minor amounts of the sulfides or polysulfides corresponding to the polyfluorothiols, i.e., the compounds R—$S_n$—R, where R is the polyfluoroalkyl radical and $n$ is an integer from 1 to 3. Minor amounts of the polyfluorothiolcarboxylic acid may also be present. When a polyfluorocarboxylic acid chloride is used as the starting material, there is often formed an appreciable amount of the corresponding polyfluorocarboxylic acid. These various components can be separated without difficulty by fractionation.

The following examples, in which parts are by weight, illustrate the invention in greater detail.

Example I

A pressure vessel made of the nickel-iron-molybdenum alloy known commercially as "Hastelloy" C was charged with 23.2 parts of perfluorobutyryl chloride and 68 parts of liquid hydrogen sulfide at −80° C. The bomb was heated at 150° C. for 2 hours, 170° C. for 2 hours and 190° C. for 6 hours, while an internal pressure of 3000 atmospheres was maintained by injection of additional liquid hydrogen sulfide into the system. At the end of the reaction period, the crude reaction product was taken up in diethyl ether to facilitate transfer and filtered to remove the sulfur formed. Distillation of the filtrate gave 7.3 parts (39% yield) of 1,1-dihydroperfluorobutanethiol-1, $C_3F_7CH_2SH$, B.P. 75–76° C. at 760 mm.

Analysis.—Calc'd for $C_4H_3F_7S$: C, 22.2; H, 1.40; F, 61.5; S, 14.8; M.W., 216. Found: C, 23.2; H, 1.49; F, 60.0; S, 14.5; M.W., 212 (cryoscopy in benzene).

Infrared and nuclear magnetic resonance analysis confirmed the structure of the product.

There was also obtained in this reaction 5.0 parts of perfluorobutyric acid, B.P. 114–119° C. at 760 mm.

A derivative was prepared by converting 1.1 parts of 1,1-dihydroperfluorobutanethiol-1 to the sodium salt and reacting the latter with 1.1 parts of 2,4-dinitrochlorobenzene according to the general procedure described by Bost et al. in J. Am. Chem. Soc., 54, 1985 (1953). There was thus obtained 1.9 parts of 1,1-dihydroperfluorobutyl-2,4-dinitrophenyl sulfide

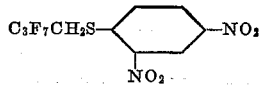

which, upon recrystallization from ethanol, formed light yellow platelets melting at 77–77.5° C.

Analysis.—Calc'd for $C_{10}H_5SN_2F_7O_4$: C, 31.4; H, 1.32; S, 8.4; N, 7.3; F, 34.8. Found: C, 31.5; H, 1.48; S, 8.5; N, 7.5; F, 34.9.

Example II

An autoclave constructed of "Hastelloy" C was charged with 23.2 parts of perfluorobutyryl chloride, 34 parts of liquid hydrogen sulfide and 2.5 parts of cobalt polysulfide as the catalyst. The autoclave was heated at 200° C. for 2 hours, 225° C. for 2 hours and 250° C. for 4 hours, the reaction being carried out under the autogenous pressure of the reactants, that is, without additional pressure. Fractionation of the liquid reaction product after removal of the sulfur gave 5 parts (23% yield) of 1,1-dihydroperfluorobutanethiol-1 and 5.7 parts of perfluorobutyric acid.

Example III

The procedure of Example II was essentially duplicated, using however perfluorobutyric acid rather than the acid chloride. The reaction product was dissolved in pentane and the solution was separated from the solids by filtration. Distillation of the filtrate gave, besides some unreacted perfluorobutyric acid, 1,1-dihydroperfluorobutanethiol-1 in smaller yield than in Example II. The product was further identified by conversion to 1,1-dihydroperfluorobutyl 2,4-dinitrophenyl sulfide as in Example I.

Example IV

Using the apparatus and procedure of Example I, a mixture of 21.7 parts of perfluorobutyric acid and 57.8 parts of hydrogen sulfide was heated at 160° C. for 2 hours, 180° C. for 2 hours and 200° C. for 6 hours while maintaining a pressure of 3000 atmospheres of hydrogen sulfide. Fractionation of the liquid reaction product gave about 6 parts of unreacted perfluorobutyric acid and 6.0 parts of 1,1-dihydroperfluorobutanethiol-1 (37% yield based on the unrecovered acid).

When the same reaction was carried out at 150° C. and 3000 atmospheres pressure, 1,1-dihydroperfluorobutanethiol-1 was obtained, but in much lower yield.

Example V

Using the apparatus and procedure of Example I, a mixture of 26.3 parts of omega-hydroperfluorovaleryl chloride, $H(CF_2)_4COCl$, and 61.2 parts of hydrogen sulfide was heated at 200° C. for 6 hours under a hydrogen sulfide pressure of 3000 atmospheres. Fractionation of the liquid reaction product gave 5.2 parts (21% yield) of 1,1,5-trihydroperfluoropentanethiol-1, $H(CF_2)_4CH_2SH$, B.P. 127° C. at 760 mm., $n_D^{26}$ 1.3430. The identity of this compound, as obtained in another preparation, was established by compositional analysis and by infrared and nuclear magnetic resonance examination.

Analysis.—Calc'd for $C_5H_4F_8S$: F, 61.3; S, 12.9. Found: F, 60.8; S, 13.0.

There was also obtained in this reaction 3.4 parts of omega-hydroperfluorovaleric acid and 2.4 parts of bis (1,1,5 - trihydroperfluoropentyl)disulfide, $[H(CF_2)_4S]_2$. The latter is a liquid boiling at 93° C. at 1.0 mm. pressure.

Analysis.—Calc'd for $C_{10}H_6F_{16}S_2$: C, 24.3; H, 1.22; F, 61.5; S, 13.0; M.W., 494. Found: C, 24.7; H, 1.46; F, 61.4; S, 12.7; M.W., 436 (cryoscopy in benzene).

Derivatives of 1,1,5-trihydroperfluoropentanethiol-1 were prepared as follows:

1,1,5-trihydroperfluoropentyl 2,4-dinitrophenyl disulfide,

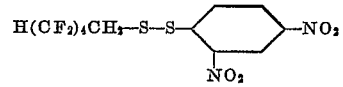

was prepared from the polyfluorothiol and 2,4-dinitrobenzenesulfenyl chloride in diethyl ether. It is a crystalline solid melting at 55.5–56.5° C.

Analysis.—Calc'd for $C_{11}H_6O_4N_2S_2F_8$: C, 29.6; H, 1.4; S, 14.4. Found: C, 29.9; H, 1.3; S, 14.3.

The thiol was converted to 1,1,5-trihydroperfluoropentanesulfonic acid, $H(CF_2)_4CH_2SO_3H$, by passing chlorine until in excess through a solution of 14 parts of the thiol in 100 parts of acetic acid containing 12 parts of water at room temperature. After removing the solvent by distillation, fractionation of the residue gave 9.5 parts of 1,1,5-trihydroperfluoropentanesulfonic acid as a liquid boiling at 138–139° C. at 1.0 mm., which solidified to a low melting, waxy, hygroscopic solid.

Analysis.—Calc'd for $C_5H_4F_8SO_3$: C, 20.3; H, 1.37; F, 51.3; S, 10.8. Found: C, 20.5; H, 1.57; F, 51.7; S, 11.0.

Infrared and nuclear magnetic resonance analysis confirmed the structure of this compound.

The barium salt was prepared by adding an aqueous solution of barium chloride to an aqueous solution of the sulfonic acid. The precipitated salt was dried over phosphoric anhydride at reduced pressure.

Analysis.—Calc'd for $C_5H_3F_8SO_3Ba½$: C, 16.5; H, 0.83; F, 41.8; S, 8.8; Ba, 18.6. Found: C, 16.7; H, 0.94; F, 40.9; S, 8.8; Ba, 18.8.

Example VI

Using the apparatus and procedure of Example I, a mixture of 27.7 parts of perfluoroglutaryl chloride,

and 57.8 parts of hydrogen sulfide was heated at 250° C. for 6 hours under a hydrogen sulfide pressure of 3000 atmospheres. Distillation of the liquid reaction product gave 4.5 parts (18.5% yield) of 1,1,5,5-tetrahydroperfluoropentane-1,5-dithiol, $HSCH_2(CF_2)_3CH_2SH$, as a liquid boiling at 92–93.5° C. at 25 mm. pressure, $n_D^{25}$ 1.4215.

*Analysis.*—Calc'd for $C_5H_6F_6S_2$: C, 24.6; H, 2.48; F, 46.7; S, 26.3; M.W., 244. Found: C, 25.0; H, 2.55; F, 45.7; S, 26.2; M.W., 228 (cryoscopy in benzene).

Infrared and nuclear magnetic resonance analysis confirmed the structure of this compound.

While the invention has been illustrated in the foregoing examples with reference to certain specific polyfluorocarboxylic acids or acid chlorides, the process is broadly applicable to the preparation of polyfluoroalkanethiols by the reaction of hydrogen sulfide with any perfluoroalkanoic acid or acid chloride, omega-hydroperfluoroalkanoic acid or acid chloride, and perfluoroalkanedioic acid or acid chloride. Illustrative examples of polyfluoroalkanethiols which can be prepared by applying the above-described procedure to the named polyfluorocarboxylic acids or their chlorides are: 2,2,2-trifluoroethanethiol from trifluoroacetic acid; 1,1-dihydroperfluoropropanethiol-1 from perfluoropropanoic acid; 1,1-dihydroperfluorohexanthiol-1, from perfluorohexanoic acid; 1,1-dihydroperfluorooctanethiol-1 from perfluorooctanoic acid; 1,1-dihydroperfluorododecanethiol-1 from perfluorododecanoic acid; 1,1-dihydroperfluorononadecanethiol-1 from perfluorononadecanoic acid; 2-2-difluoroethanethiol-1 from difluoroacetic acid; 1,1,3-trihydroperfluoropropanethiol-1 from omega-hydroperfluoropropanoic acid; 1,1,7-trihydroperfluoroheptanethiol-1 from omega-hydroperfluoroheptanoic acid; 1,1,9-trihydroperfluorononanethiol-1 from omega-hydroperfluorononanoic acid; 1,1,11-trihydroperfluoroundecanethiol-1 from omega-hydroperfluoroundecanoic acid; 1,1,13-trihydroperfluorotridecanethiol-1 from omega-hydroperfluorotridecanoic acid; 1,1,19-trihydrononadecanethiol-1 from omega-perfluorononadecanoic acid; 2,2-difluoropropane-1,3-dithiol from difluoromalonic acid; 1,1,4,4-tetrahydroperfluorobutane-1,4-dithiol from perfluorosuccinic acid; 1,1,6,6-tetrahydroperfluorohexane-1,6-dithiol from perfluoroadipic acid; 1,1,10,10 - tetrahydroperfluorodecane - 1,10-dithiol from perfluorosebacic acid; and the like. The more readily available and therefore preferred starting materials are the polyfluoroalkanoic acids, or their chlorides, in which the polyfluoroalkyl chain attached to the carboxyl group, or, in the case of the dicarboxylic acids, the perfluoroalkylene chain, has from 1 to 18 carbon atoms.

The polyfluorocarboxylic acids or acid halides which serve as starting materials in the process of this invention can be prepared by methods described in the journal or patent literature. Thus, the perfluoromonocarboxylic acids, RCOOH, where R is $C_nF_{2n+1}$, can be obtained as described in U.S. Patent 2,567,011, or by oxidation of the 1,1-dihydroperfluoroalkanols, $C_nF_{2n+1}CH_2OH$, of U.S. Patent 2,666,797; the omega-hydroperfluorocarboxylic acids, RCOOH, where R is $H-C_nF_{2n}$, may be prepared according to U.S. Patent 2,559,629; and perfluorodicarboxylic acids have been described by McBee et al. in Ind. Eng. Chem., 39, 415 (1947), and in other publications, e.g., U.S. Patent 2,606,206. The corresponding acid chlorides are prepared by known methods.

The polyfluoroalkanethiols obtainable by the process of this invention possess the normal reactivity of the mercapto group and are thus adapted to any of the known uses for which thiols in general are suitable. They also possess the advantages imparted by the presence of a fluorocarbon chain, including increased stability towards physical and chemical agents and substantial uninflammability.

Specifically, the polyfluoroalkanethiols are useful per se as metal deactivators in gasoline, corrosion inhibitors in pickling and metal-cleaning baths, stabilizers for fluoroolefins such as tetrafluoroethylene, viscosity-decreasing agents and chain-transfer agents in vinyl polymerization, etc. They are also useful as starting materials for a variety of useful highly fluorinated sulfur compounds such as sulfides, polysulfides, sulfoxides, sulfones and sulfonic acids. The polyfluorosulfonic acids, in particular, are useful as surface-active agents and dispersing agents, for example in the polymerization of fluoroolefins such as tetrafluoroethylene. The polyfluoroalkanethiols are also capable of addition to olefins to give stable sulfides suitable as heat-transfer agents.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing a polyfluoroalkanethiol which comprises bringing into contact and reacting, at a temperature within the range of 150° to 300° C. hydrogen sulfide with a polyfluoro compound having the formula Y—R—COZ wherein Y is selected from the class consisting of H, F and —COZ, R is a straight chain perfluoroalkylene radical of from 1–18 carbon atoms and Z is selected from the class consisting of OH and Cl, under a pressure at least equal to the autogenous pressure of the reactants, with the proviso that when the operating pressure is less than 1000 atmospheres, said hydrogen sulfide and polyfluoro compound are reacted in contact with a sulfactive hydrogenation catalyst, and obtaining as a resulting product a polyfluoroalkanethiol having the formula X—R—$CH_2SH$ wherein X is selected from the class consisting of H, F and —$CH_2SH$ and R is defined as aforesaid.

2. Process for preparing a polyfluoroalkanethiol which comprises bringing into contact and reacting, at a temperature within the range of 150° to 300° C., hydrogen sulfide with a perfluoromonocarboxylic acid having the formula R—COOH wherein R is a straight chain perfluoroalkyl radical of from 1–18 carbon atoms, under a pressure at least equal to the autogenous pressure of the reactants and in contact with a sulfactive hydrogenation catalyst, and obtaining as a resulting product a perfluoroalkanethiol having the formula R—$CH_2SH$ wherein R is defined as aforesaid.

3. Process for preparing a polyfluoroalkanethiol which comprises bringing into contact and reacting, at a temperature within the range of 150° to 300° C., hydrogen sulfide with a perfluoromonocarboxylic acid having the formula R—COOH wherein R is a straight chain perfluoroalkyl radical of from 1–18 carbon atoms, under a pressure of at least 1000 atmospheres, and obtaining as a resulting product a perfluoroalkanethiol having the formula R—$CH_2SH$ wherein R is defined as aforesaid.

4. Process for preparing a polyfluoroalkanethiol which comprises bringing into contact and reacting, at a temperature within the range of 150° to 300° C. hydrogen sulfide with an omega-hydroperfluoromonocarboxylic acid having the formula R—COOH wherein R is a straight chain omega-hydroperfluoroalkyl radical of from 1–18 carbon atoms, under a pressure at least equal to the autogenous pressure of the reactants and in contact with a sulfactive hydrogenation catalyst, and obtaining as a resulting product an omega-hydroperfluoroalkanethiol having the formula R—$CH_2SH$ wherein R is defined as aforesaid.

5. Process for preparing a polyfluoroalkanethiol which comprises bringing into contact and reacting, at a temperature within the range of 150° to 300° C. hydrogen sulfide with an omega-hydroperfluoromonocarboxylic acid having the formula R—COOH wherein R is a straight chain omega-hydroperfluoroalkyl radical of from 1–18 carbon atoms, under a pressure of at least 1000 atmospheres, and obtaining as a resulting product an omega-hydroperfluoroalkanethiol having the formula R—CH$_2$SH wherein R is defined as aforesaid.

6. Process for preparing a polyfluoroalkanethiol which comprises bringing into contact and reacting, at a temperature within the range of 150° to 300° C. hydrogen sulfide with a perfluoromonocarboxylic acid chloride having the formula R—COCl wherein R is a straight chain perfluoroalkyl radical of from 1–18 carbon atoms, under a pressure at least equal to the autogenous pressure of the reactants and in contact with a sulfactive hydrogenation catalyst, and obtaining as a resulting product a perfluoroalkanethiol having the formula R—CH$_2$SH wherein R is defined as aforesaid.

7. Process for preparing a polyfluoroalkanethiol which comprises bringing into contact and reacting, at a temperature within the range of 150° to 300° C. hydrogen sulfide with a perfluoromonocarboxylic acid chloride having the formula R—COCl wherein R is a straight chain perfluoroalkyl radical of from 1–18 carbon atoms, under a pressure of at least 1000 atmospheres, and obtaining as a resulting product a perfluoroalkanethiol having the formula R—CH$_2$SH wherein R is defined as aforesaid.

8. Process for preparing a polyfluoroalkanethiol which comprises bringing into contact and reacting, at a temperature within the range of 150° to 300° C. hydrogen sulfide with an omega-hydroperfluoromonocarboxylic acid chloride having the formula R—COCl wherein R is a straight chain omega-hydroperfluoroalkyl radical of from 1–18 carbon atoms, under a pressure at least equal to the autogenous pressure of the reactants and in contact with a sulfactive hydrogenation catalyst, and obtaining as a resulting product an omega-hydroperfluoroalkanethiol having the formula R—CH$_2$SH wherein R is defined as aforesaid.

9. Process for preparing a polyfluoroalkanethiol which comprises bringing into contact and reacting, at a temperature within the range of 150° to 300° C. hydrogen sulfide with an omega-hydroperfluoromonocarboxylic acid chloride having the formula R—COCl wherein R is a straight chain omega-hydroperfluoroalkyl radical of from 1–18 carbon atoms, under a pressure of at least 1000 atmospheres, and obtaining as a resulting product an omega-hydroperfluoroalkanethiol having the formula R—CH$_2$SH wherein R is defined as aforesaid.

10. Process for preparing a polyfluoroalkanethiol which comprises bringing into contact and reacting, at a temperature within the range of 150° to 300° C., hydrogen sulfide with a perfluorodicarboxylic acid having the formula HOOC—R—COOH wherein R is a straight chain perfluoroalkylene radical of from 1–18 carbon atoms, under a pressure at least equal to the autogenous pressure of the reactants and in contact with a sulfactive hydrogenation catalyst, and obtaining as a resulting product a dithiol having the formula HSCH$_2$—R—CH$_2$SH wherein R is defined as aforesaid.

11. Process for preparing a polyfluoroalkanethiol which comprises bringing into contact and reacting, at a temperature within the range of 150° to 300° C., hydrogen sulfide with a perfluorodicarboxylic acid having the formula HOOC—R—COOH wherein R is a straight chain perfluoroalkylene radical of from 1–18 carbon atoms, under a pressure of at least 1000 atmospheres, and obtaining as a resulting product a dithiol having the formula HSCH$_2$—R—CH$_2$SH wherein R is defined as aforesaid.

12. Process for preparing a polyfluoroalkanethiol which comprises bringing into contact and reacting, at a temperature within the range of 150° to 300° C., hydrogen sulfide with a perfluorodicarboxylic acid chloride having the formula ClOC—R—COCl wherein R is a straight chain perfluoroalkylene radical of from 1–18 carbon atoms, under a pressure at least equal to the autogenous pressure of the reactants and in contact with a sulfactive hydrogenation catalyst, and obtaining as a resulting product a dithiol having the formula HSCH$_2$—R—CH$_2$SH wherein R is defined as aforesaid.

13. Process for preparing a polyfluoroalkanethiol which comprises bringing into contact and reacting, at a temperature within the range of 150° to 300° C., hydrogen sulfide with a perfluorodicarboxylic acid chloride having the formula ClOC—R—COCl wherein R is a straight chain perfluoroalkylene radical of from 1–18 carbon atoms, under a pressure of at least 1000 atmospheres, and obtaining as a resulting product a dithiol having the formula HSCH$_2$—R—CH$_2$SH wherein R is defined as aforesaid.

14. Process for preparing 1,1-dihydroperfluorobutanethiol-1 which comprises bringing into contact and reacting, at a temperature within the range of 150° to 300° C., hydrogen sulfide with perfluorobutyryl chloride under a pressure of at least 1000 atmospheres.

15. Process for preparing 1,1,5-trihydroperfluoropentanethiol-1 which comprises bringing into contact and reacting at a temperature within the range of 150° to 300° C., hydrogen sulfide with omega-hydroperfluorovaleryl chloride under a pressure of at least 1000 atmospheres.

16. Process for preparing 1,1,5,5-tetrahydroperfluoropentane-1,5-dithiol which comprises bringing into contact and reacting, at a temperature within the range of 150° to 300° C., hydrogen sulfide with perfluoroglutaryl chloride under a pressure of at least 1000 atmospheres.

References Cited in the file of this patent

FOREIGN PATENTS 340,493     Italy _____ May 18, 1936